(12) United States Patent
Boxwell et al.

(10) Patent No.: US 11,163,953 B2
(45) Date of Patent: Nov. 2, 2021

(54) NATURAL LANGUAGE PROCESSING AND CANDIDATE RESPONSE EVALUATION

(71) Applicant: International Business Machines Corporation, Armonk, NY (US)

(72) Inventors: Stephen A. Boxwell, Columbus, OH (US); Keith G. Frost, Delaware, OH (US); Kyle M. Brake, Dublin, OH (US); Stanley J. Vernier, Dublin, OH (US)

(73) Assignee: International Business Machines Corporation, Armonk, NY (US)

(*) Notice: Subject to any disclaimer, the term of this patent is extended or adjusted under 35 U.S.C. 154(b) by 247 days.

(21) Appl. No.: 16/439,220

(22) Filed: Jun. 12, 2019

(65) Prior Publication Data

US 2020/0394262 A1   Dec. 17, 2020

(51) Int. Cl.
| | | |
|---|---|---|
| *G06F 40/284* | (2020.01) | |
| *G06N 5/04* | (2006.01) | |
| *G06F 40/35* | (2020.01) | |
| *G06F 16/903* | (2019.01) | |
| *G06F 16/33* | (2019.01) | |
| *G06F 16/332* | (2019.01) | |

(52) U.S. Cl.
CPC ........ *G06F 40/284* (2020.01); *G06F 16/3329* (2019.01); *G06F 16/3344* (2019.01); *G06F 16/90344* (2019.01); *G06F 40/35* (2020.01); *G06N 5/04* (2013.01)

(58) Field of Classification Search
CPC ...... G06N 5/04; G06N 16/22; G06N 16/3329; G06N 16/3344; G06N 16/90332; G06N 16/90344; G06N 40/284; G06N 40/35
See application file for complete search history.

(56) References Cited

U.S. PATENT DOCUMENTS 7,260,773 B2 * 8/2007 Zernik .................. G06F 40/131
                                                       715/229
7,720,772 B2   5/2010 Kanungo et al.
(Continued)

OTHER PUBLICATIONS

Jimenez, M., et al., On the Impact of Tokenizer and Parameters on N-Gram Based Code Analysis, 2018 IEEE International Conference on Software Maintenance and Evolution (ICSME), Sep. 2018.
(Continued)

*Primary Examiner* — Eric Yen
(74) *Attorney, Agent, or Firm* — Lieberman & Brandsdorfer, LLC

(57) ABSTRACT

Embodiments relate to an intelligent computer platform to identify and evaluate candidate passages response data in natural language form. A passage is analyzed by applying input tokens against passage tokens. A structure representing the analyzed passage is populated with of matching input and passage tokens. The input and passage tokens are used to assess the structure. First and second counts of token matching criteria are determined, including a first count of matching token entries and a second count of evaluated token entries. An alignment of the passage to a candidate question is calculated and a ratio of the first and second counts is assessed. Data from the passage are returned with the ratio.

25 Claims, 9 Drawing Sheets

(56) References Cited

U.S. PATENT DOCUMENTS

| | | | | |
|---|---|---|---|---|
| 8,631,007 | B1* | 1/2014 | Blandford | G06Q 30/0256 |
| | | | | 707/736 |
| 9,129,022 | B2* | 9/2015 | Schuil | G06Q 30/08 |
| 9,367,608 | B1* | 6/2016 | Zhang | G06F 16/35 |
| 9,678,946 | B2 | 6/2017 | Nauze et al. | |
| 9,778,914 | B2 | 10/2017 | Danielson et al. | |
| 9,910,985 | B2 | 3/2018 | Cohen | |
| 10,061,765 | B2 | 8/2018 | Cook et al. | |
| 10,140,983 | B2 | 11/2018 | Kurata et al. | |
| 10,733,383 | B1* | 8/2020 | Shah | G06F 40/30 |
| 2005/0131872 | A1* | 6/2005 | Calbucci | G06F 16/3338 |
| 2006/0241934 | A1* | 10/2006 | Izuha | G06F 40/53 |
| | | | | 704/2 |
| 2009/0240650 | A1* | 9/2009 | Wang | G06F 16/685 |
| | | | | 706/54 |
| 2009/0281791 | A1 | 11/2009 | Li | |
| 2011/0047171 | A1* | 2/2011 | Paparizos | G06F 16/252 |
| | | | | 707/760 |
| 2015/0169582 | A1* | 6/2015 | Jain | G06F 16/2468 |
| | | | | 707/748 |
| 2015/0347422 | A1 | 12/2015 | Fadel et al. | |
| 2016/0125872 | A1 | 5/2016 | Golipour et al. | |
| 2017/0024311 | A1* | 1/2017 | Andrejko | G06F 11/3684 |
| 2017/0228372 | A1* | 8/2017 | Moreno | G06F 16/3329 |
| 2017/0277668 | A1* | 9/2017 | Luo | G06F 16/345 |
| 2018/0075348 | A1* | 3/2018 | Zhao | G06N 3/0445 |
| 2018/0114108 | A1* | 4/2018 | Lao | G06N 3/0445 |
| 2018/0197001 | A1* | 7/2018 | Bender | G06K 9/00483 |
| 2018/0365222 | A1 | 12/2018 | Peranandam et al. | |
| 2019/0103111 | A1* | 4/2019 | Tiwari | G06F 16/3334 |
| 2019/0163692 | A1* | 5/2019 | Duan | G06F 16/3329 |
| 2019/0227823 | A1* | 7/2019 | Xiao | G06F 40/279 |
| 2019/0272296 | A1* | 9/2019 | Prakash | G06F 16/243 |
| 2019/0303273 | A1* | 10/2019 | Dwane | G06F 11/3684 |
| 2020/0012543 | A1* | 1/2020 | Masuda | G06F 11/0793 |
| 2020/0192924 | A1* | 6/2020 | Jahankhani | G06F 40/289 |
| 2021/0080942 | A1* | 3/2021 | Kono | G05B 23/0283 |

OTHER PUBLICATIONS

Song, M., et al., Multimodal Representation:Kneser-Ney Smoothing/Skip-Gram Based Neural Language Model, IEEE International Conference on Image Processing, 2016.

Pickhardt, R., et al., A Generalized Language Model as the Combination of Skipped n-grams and Modified Kneser-Ney Smoothing, Proceedings of the 52nd Annual Meeting of the Association for Computational Linguistics, pp. 1145-1154, Jun. 23-25, 2014.

Poliak, A., et al., Efficient, Compositional, Order-Sensitive n-gram Embeddings, Proceedings of the 15th Conference of the European Chapter of the Association for Computational Linguistics, vol. 2, Short Papers, pp. 503-508, Apr. 3-7, 2017.

List of IBM Patents or Applications Treated as Related, Jun. 2019.

* cited by examiner

NATURAL LANGUAGE PROCESSING AND CANDIDATE RESPONSE EVALUATION

BACKGROUND

The present embodiments relate to natural language processing. More specifically, the embodiments relate to identifying matching content of a passage and question, and evaluating closeness criteria of the matching content.

In the field of artificially intelligent computer systems, natural language systems (such as the IBM Watson® artificially intelligent computer system or and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult and a practical level inefficient.

SUMMARY

The embodiments include a system, computer program product, and method for identifying and evaluating candidate passage response data.

In one aspect, a method is provided to utilize natural language processing (NLP) and identify and evaluate candidate response data. A passage is subject to NLP analysis by applying one or more input tokens against one or more passage tokens. A structure representing the analyzed passage is generated and populated with one or more entries identifying matching input and passage tokens. Both the input and passage tokens are represented in compact form. The structure is leveraged by iteratively associating a mapping of the represented input and passage tokens as an index representation. , and accumulating a first count of matching token entries and a second count of evaluated token entries, with both counts of entries being qualified by a closeness criteria, An alignment of the passage to a candidate question is calculated in the form of a ratio of the first and second counts. An answer including the passage and the corresponding ratio is returned.

In another aspect, a computer program device is provided employing NLP to identify and evaluate candidate passages responses. The device has program code embodied therewith. The program code is executable by a processing unit to analyze a natural language passage by applying one or more input tokens against one or more passage tokens. A structure representing the analyzed passage is generated and populated with one or more entries identifying matching input and passage tokens. The input and passage tokens are represented in compact form. Program code is provided to leverage the structure, including iteratively associating a mapping of the represented input and passage tokens as an index representation. Program code accumulates first and second entry counts, including a first count of matching token entries and a second count of evaluated token entries. Both the first and second counts are qualified by a closeness criteria. Program code calculates an alignment of the passage to a candidate question in the form of a ratio of the first and second counts. An answer including the passage and the corresponding ratio is returned.

In yet another aspect, a system is provided for use with an intelligent computer platform to identify and evaluate candidate passages responses. A processing unit is operatively coupled to memory and is in communication with the artificial intelligence platform. A natural language (NL) manager, in communication with the processing unit, is activated by the artificial intelligence platform and employed to analyze a natural language passage by applying one or more input tokens against one or more passage tokens. A structure manager generates a structure representing the analyzed passage, and populates the structure with one or more entries identifying matching input and passage tokens. A token manager represents the input and passage tokens in compact form. The token manager leverages the structure and iteratively associates a mapping of the represented input and passage tokens as an index representation. The token manager determines a first count of matching token entries and a second count of evaluated token entries with both counts of entries being qualified by a closeness criteria. The director calculates an alignment of the passage to a candidate question in the form of a ratio of the first and second counts. An answer including the passage together with the corresponding ratio is returned.

In a further aspect, a method is provided for use by an intelligent computer platform to identify and evaluate candidate passages responses. A passage in natural language form is analyzed and one or more passage tokens matching one or more input tokens are identified. A structure is generated and populated with one or more of the identified matching tokens. The structure is leveraged and the input tokens and matching passage tokens are associated with the structure as an index representation. The leveraged structure is assessed with the compact representation of the tokens and a determination is made of a first count of matching token entries and a second count of evaluated token entries with both counts being qualified by a closeness criteria. An alignment of the passage to the input tokens is calculated and a ratio of the first count and the second count is assessed. Data from the passage qualified by the one or more input tokens is returned with the assessed ratio.

In yet another aspect, a computer program device is provided for use with an intelligent computer platform and program code to identify and evaluate candidate passages responses. The device has program code embodied therewith. The program code is executable by a processing unit to analyze a passage in natural language form, and identify one or more passage tokens matching one or more input tokens. A structure representing the analyzed passage is generated and populated with identified matching tokens. The structure is leveraged and the input tokens and matching passage tokens are associated with the structure as an index representation. The leveraged structure is assessed and a determination is made of a first count of matching token entries and a second count of evaluated token entries with both counts being qualified by a closeness criteria. An alignment of the passage to the input tokens is calculated and a ratio of the first count and the second count is assessed. Data from the passage qualified by the one or more input tokens is returned with the assessed ratio.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Bitwise is a level of operations that involves working with individual bits, which are the smallest units of data in a computer. Each bit has a single binary value: 0 or 1. Bitwise operators are characters that represent actions to be performed on single bits. A bit operation operates on two-bit patterns of equal lengths by positionally matching their individual bits. Examples of bitwise operations include, but are not limited to, logical AND, logical OR, logical NOT, and logical XOR, also known as exclusive OR.

As shown and described herein, bitwise operations are utilized for natural language processing of a passage and corresponding questions as submitted against the passage. One or more matching question and answer pairs are evaluated with respect to confidence and proximity. Matching criteria, which in one embodiment may include projection of a closeness criteria, e.g. skip n-grams, onto one or more corresponding bitfield(s), is subject to evaluation in one or more bitwise operations.

Figure 1:
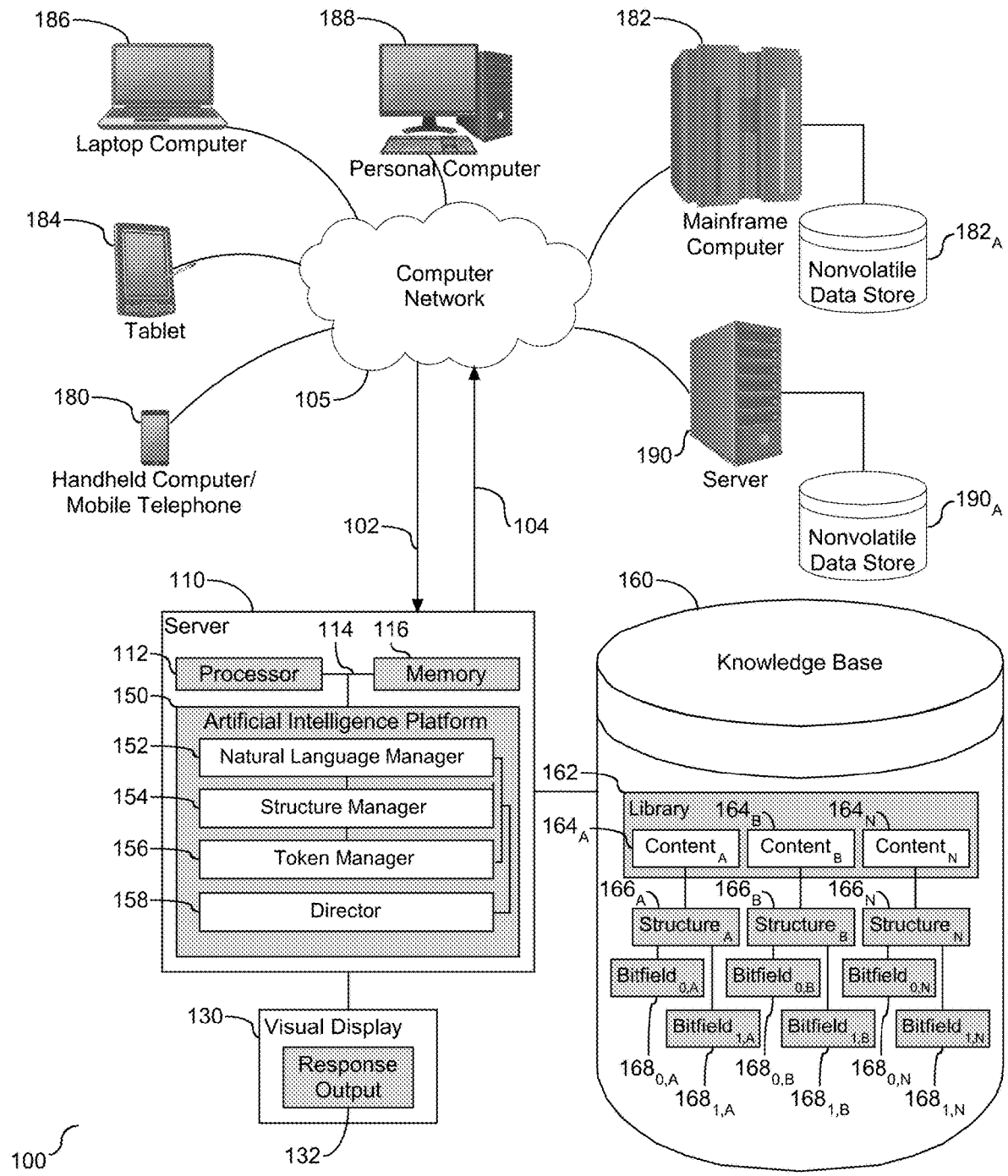
FIG. 1 depicts a system diagram illustrating a system connected in a network environment that supports natural language processing (NLP).

Referring to FIG. 1, a schematic diagram of a natural language processing system (100) is depicted. As shown, a server (110) is provided in communication with a plurality of computing devices (180), (182), (184), (186), (188), and (190) across a network connection (105). The server (110) is configured with a processing unit in communication with memory across a bus. The server (110) is shown with an artificial intelligence platform (150) for natural language processing over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The artificial intelligence platform (150) is shown herein configured to identify and evaluate candidate passage responses from various sources. For example, artificial intelligence platform (150) may receive input from the network (105) and leverage a data source (160), also referred to herein as a corpus or knowledge base, to create output or response content (132). As shown, the data source (160) is configured with a library (162) of logically grouped documents. In one embodiment, the data source (160) may be configured with other or additional sources of input, and as such, the sources of input shown and described herein should not be considered limiting. Although only one library (162) is shown, it is understood that the knowledge base (160) may include or be operatively coupled to a plurality of libraries. Similarly, in one embodiment, the data source (160) includes structured, semi-structured, and/or unstructured content in a plurality of documents that are contained in one or more databases or corpus. The various computing devices (180), (182), (184), (186), (188), and (190) in communication with the network (105) may include access points for logically grouped documents. Some of the computing devices may include devices for a database storing the corpus of data as the body of information used by the artificial intelligence platform (150) to generate output or response content (132), and to communicate the response content to a visual display (130) operatively coupled to the server or one or more of the computing devices (180)-(190) across the network connection (104).

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in documents, network accessible sources and/or structured data sources. In this manner, some processes populate the artificial intelligence platform (150), with the artificial intelligence platform (150) also including input interfaces to receive requests and respond accordingly.

As shown, content may be in the form of one or more logically grouped documents or data source entries in the library (162) for use as part of the corpus (160) of data with the artificial intelligence platform (150). The corpus (160) may include any structured and unstructured documents, including but not limited to any file, text, article, or source of data (e.g. scholarly articles, dictionary, definitions, encyclopedia references, and the like) for use by the artificial intelligence platform (150). Content users may access the artificial intelligence platform (150) via a network connection or an internet connection to the network (105), and may submit natural language input to the artificial intelligence platform (150) that may effectively determine response content (132), e.g. an output response, related to the input by searching content in the corpus of data local to the data source (160) or any electronic data source operatively coupled to the server (110) across the network (105).

The artificial intelligence platform (150) is shown herein with several tools to support identification and processing of response content (132), including a natural language (NL) manager (152), a structure manager (154), a token manager (156), and a director (158). The NL manager (152) functions to conduct an initial NL analysis of content, or in one embodiment a passage within the content, in electronic form. Analysis of content or a passage within the content is collectively referred to as passage content. As further described below, the NL manager (152) is employed to apply input criteria, referred to herein as one or more input tokens, to the passage content. The NL manager (152) subjects the passage content to analysis against the input token(s), thereby identifying content within the passage that matches the input token(s). Both the input token(s) and the passage are in NL form. In one embodiment, each token may be a representation of a word to be applied to the passage content. Similarly, in one embodiment, the NL manager identifies and applies matching criteria to the passage to identify matching content. The matching criteria may be an exact match, a synonym match, a lemma match, or any method of drawing equivalent between two natural language tokens. Accordingly, the NL manager (152) conducts natural language process and application of NL tokens against passage content to identified matches or matching tokens.

The input tokens may be in the form of a query presented to the passage to identify response data. The query may be in the form of received content (102). The NL manager (152) detects and receives the content (102), which in one embodiment may be in the form of when an electronic communication is detected across a corresponding network connection. The NL manager (152) is employed to evaluate the communication, and can use a variety of protocols to parse the detected communication, including identify content within the detected communication based on the relation between signifiers, such as words, phrases, signs, and symbols, and what they stand for, their denotations, or connotation. The NL manager (152) is shown herein as a tool embedded within the artificial intelligence platform (150) and utilizes natural language processing protocols to enable query processing. In one embodiment, the NL manager (152) converts the electronic communication to tokens for processing against passage tokens.

As shown, the structure manager (154) is operatively coupled to the NL manager (152). The structure manager (154) generates or otherwise creates a structure to represent the analyzed content or passage content. In one embodiment, the structure is stored in the knowledge base (160) and associated with corresponding content. Similarly, in one embodiment, the structure is a matrix with a first dimension representing passage content and a second dimension representing input tokens. As shown, the knowledge base (160) includes a library (162) of content, shown herein as content$_A$ (164$_A$), content$_B$ (164$_B$), and content$_N$ (164$_N$). Although only three forms of content are shown, the quantity is for illustrative purposes and should not be considered limiting. As a structure is created by the structure manager (154), the structure is associated with corresponding content. Referring to the knowledge base (160), each content element in the library (162) is shown with a corresponding structure, including structure$_A$ (166$_A$) operatively coupled to content$_A$ (164$_A$), structure$_B$ (166$_B$) operatively coupled to content$_B$ (164$_B$), and structure$_N$ (166$_N$) operatively coupled to content$_N$ (164$_N$). Each structure, e.g. (166$_A$)-(166$_N$), is a representation of the corresponding passage reflecting the analysis based on applied tokens, e.g. focus. The structures are populated with entries identifying matching input tokens, e.g. focus, and candidate answers from the passage, e.g. passage tokens.

A token manager (156) is shown operatively coupled to the structure manager (154). The token manager (156) identifies an alignment of the input token(s) and the matching passage token(s), as exhibited in the corresponding structure. The input and passage tokens may be represented in compact form by the token manager (156). In one embodiment, the compact form is a bitfield representation, with the token manager (156) representing the input tokens as a first bitfield and the passage tokens as a second bitfield. Referring to the knowledge base (160), the corresponding structure(s) is shown with the bitfield representations. For example, structure$_A$ (166$_A$) is shown with a first bitfield$_{0,A}$ (168$_{0,A}$) and a second bitfield$_{1,A}$ (168$_{1,A}$), structure$_B$ (166$_B$) is shown with a first bitfield (168$_{0,B}$) and a second bitfield$_{1,B}$ (168$_{1,B}$), and structure$_N$ (166$_N$) is shown with a first bitfield$_{0,N}$ (168$_{0,N}$) and a second bitfield$_{1,N}$ (168$_{1,N}$). In addition to the first and second bitfields, the structure manager (154) identifies an index in the corresponding structure with matching tokens, and represents the identified index as a third bitfield. Details of the index bitfield representation are shown and described in FIGS. 4A-4C. Accordingly, in the embodiment with the compact form representation, the bitfield representations are associated with the corresponding structure.

The director (158) functions to support bitwise operations of the bitfield representations, e.g. the first bitfield, the second bitfield, and the third bitfield. A closeness criteria, e.g. skip n-gram, is applied by the director (158) as a qualifier in identifying matching input and passage tokens.

The director (158) projects the closeness criteria into each of the bitfield representations. As shown and described in detail in FIGS. 4A-4C, the director (158) performs a first bitwise operation using the first and second bitfield representations of a structure. The first bitwise operation includes expanding bits set in the third bitfield, with the expansion setting all bits within a range that match a first criteria. In addition, the director (158) performs a second bitwise operation using the third bitfield. The second bitwise operation discounts when only a single token is found in a multiple token search.

The token manager (156) functions to leverage the corresponding structure and the identified alignment, and iteratively associates a mapping of the input token(s) in the passage as an index representation. Two counts are generated or determined by the iterative association, including a first count of matching token entries qualified by a closeness criteria, e.g. skip n-gram, and a second count of evaluated token entries, also qualified by the closeness criteria. As shown, a director (158) is operatively coupled to the token manager (156). The director (158) uses the first and second counts to calculate an alignment of the passage to a candidate question or query as represented by the input token(s). The calculation is a ratio of the first and second counts, with the ratio corresponding to a confidence value, with the confidence value being the ratio of the quantity of n-grams found in the passage and the quantity of n-grams evaluated in the passage. Application of the input token(s) to the passage token(s) creates output, and the calculated ratio is attached to the output (132).

The output (132) may be presented on a visual display (130) operatively coupled to the server (110). In one embodiment, the ratio or corresponding indicia may be applied or attached to the output (132). The ratio is a number between 0 and 1, with a value closer to 1 indicating confidence in accuracy of the created output with respect to the input token(s). Similarly, in one embodiment, there may be a plurality of candidates, with the output (132) being the content entity with the highest ratio value.

The tools shown and described herein, (152)-(158), and the corresponding functionality support and enable an efficient evaluation of NL on query and passage pairs. The compact representation and corresponding operations provide efficiency in terms of memory and performance, providing faster responses and permitting skip n-grams of greater length, e.g. a higher integer value for n, while providing response accuracy and confidence.

Received content (102) may be processed by the IBM Watson® server (110), and the corresponding artificial intelligence platform (150). As shown herein, the NL manager (152), the structure manager (154), token manager (156), and director (158) perform an analysis of the input content (102) using a variety of algorithms and associated protocols. In some illustrative embodiments, server (110) may be the IBM Watson® system available from International Business Machines Corporation of Armonk, N.Y., which is augmented with the mechanisms of the illustrative embodiments described hereafter. The IBM Watson® system may receive the detected electronic communication as input content (102) which it then analyzes to identify characteristics of the content (102) that in turn are applied to the corpus of data (160). Based on application of the content (102) to the corpus of data (160), a set of candidate outcomes are generated by looking across the corpus of data (160) for portions of the corpus of data (160) that have some potential for containing a response matching or corresponding to the identified content characteristic(s) of the content (102).

The director (158) conducts an analytical analysis of potential response content to identify the response content (132). In one embodiment, the response content (132) may include a plurality of response content, each with a corresponding score or indicia reflective of the score, with the score being the ratio assessed for each content. The scores indicate or reflect the extent to which the candidate responses and their content are relevant. In one embodiment, each content resulting score is weight. The score may be used as a level of confidence that the IBM Watson® system has regarding evidence that the candidate response content is accurate with respect to the query or electronic communication applied against the passage or content. Accordingly, the response content (132) is a final response candidate or ranked set of candidate responses.

The response output (132) is directed at specific content. For example, in one embodiment, the response output (132) may be a direct answer to an interrogatory. In one embodiment, the response output (132 may be in the form of a link to a source for the response content. Similarly, in one embodiment, the response output (132) may include both content and the source link. Accordingly, the content of the response may come in different forms, or a combination of forms.

The NL manager (152), structure manager (154), token manager (156), and director (158), hereinafter referred to collectively as AI tools, are shown as being embodied in or integrated within the artificial intelligence platform (150) of the server (110). The AI tools may be implemented in a separate computing system (e.g., 190) that is connected across network (105) to the server (110). Wherever embodied, the AI tools function to evaluate electronic communication, and identify a response to the evaluated electronic communication, with an evaluation of a strength of the identified response attached to the response output (132). The strength may be a numerical identifier or alternative indicia so that a corresponding and accurate response and response content may be communicated as response content to provide an answer to the identified interrogatory(s).

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

The information handling system employed to support the artificial intelligence platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
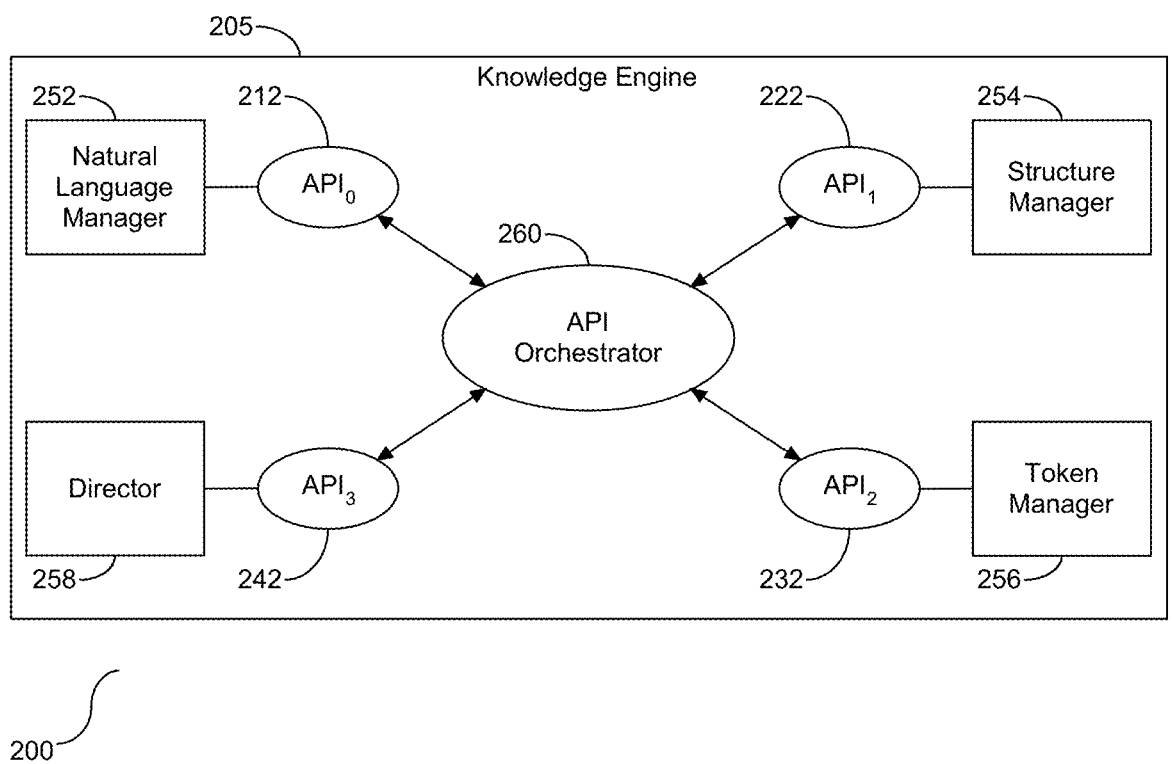
FIG. 2 depicts a block diagram illustrating the natural language processing tools, as shown and described in FIG. 1, and their associated application program interfaces.

An Application Program Interface (API) is understood in the art as a software intermediary between two or more applications. With respect to the artificial intelligence platform (150) shown and described in FIG. 1, one or more APIs may be utilized to support one or more of the tools (152)-(158) and their associated functionality. Referring to FIG. 2, a block diagram (200) is provided illustrating the tools (152)-(158) and their associated APIs. As shown, a plurality of tools are embedded within the AI platform (205), with the tools including the NL manager (252) associated with $API_0$ (212), the structure manager (254) associated with $API_1$ (222), the token manager (256) associated with $API_2$ (232), and the director (258) associated with $API_3$ (242). Each of the APIs may be implemented in one or more languages and interface specifications. $API_0$ (212) provides functional support to apply NLP to analyze a passage in NL form; $API_1$ (222) provides functional support to generate a structure representing a mapping of matching content between the passage and input tokens; $API_2$ (232) provides functional support to iteratively associate the input token(s) and passage token(s), and furthermore to determine a first and second count to be employed in the ratio assessment; and $API_3$ (242) provides functional support to calculate an alignment of the passage with the candidate question, which includes assessment of a ratio of the first and second counts. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
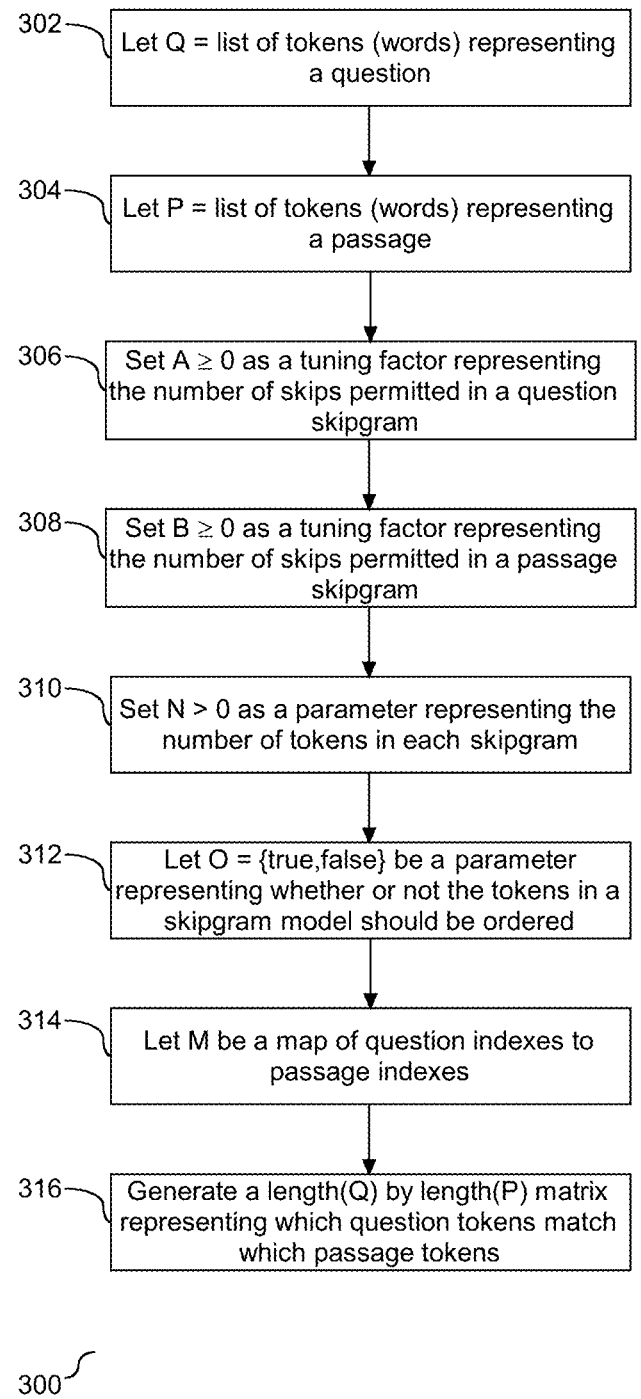
FIG. 3 depicts a flow chart illustrating a process for evaluating question and answer pairs.

Referring to FIG. 3, a flow chart (300) is provided to illustrate evaluation of question and answer pairs. There are several variables employed in the evaluation process. As shown, the variable Q represents a list of question tokens (302), e.g. words, representing a question to be submitted to a passage, the variable P represents a list of passage tokens (304), e.g. words, representing a passage designated to receive one or more questions. It is understood that the question tokens and the passage tokens are each natural language tokens. Two tuning factors are defined, including a question tuning factor and a passage tuning factor. In an embodiment where tokens, e.g. words, are represented in vector form, the tuning factor represents a quantity of adjacent words that may be omitted from a corresponding matching protocol. The question tuning factor, A, represents a number of tokens that can be omitted from adjacency matching with respect to the submitted question. The tuning factor, A, is defined as an integer that is greater than or equal to 0 (306). For example, a tuning factor of 0 is an indication that a matching answer within the question must be precise, and a tuning factor of 1 is an indication that the matching answer with respect to the question may omit one word with respect to adjacency to the received question. The passage tuning factor, B, represents the number of tokens that can be omitted from adjacency matching with respect to the evaluated passage or the passage subject to evaluation (308). Accordingly, the tuning factors, A and B, individually and separately represent a proximity value between the received or submitted question and the passage subject to evaluation.

In addition to the question and passage tuning factors, additional variables employed in the evaluation process are defined. It is understood that both the passage and corresponding question(s) subject to evaluation are in vector form. The variable N, which is set as at least one variable, represents a quantity of tokens in each passage (310), with the passage including at least one token. One of the factors in evaluating the question and passage is the order of the tokens. In one embodiment, the order may be a factor or may not be a factor. The variable, O, is defined as an order parameter and may be set to true or false (312). If O is set to true, then the tokens in the passage should be found in a specific order with respect to the question, and if O is set to false, then the tokens found in the passage are not required to be in a specific order. A variable M represents a map of question indexes to passage indexes, the map representing one or more focus key value pairs (314). Each created focus key value pair represents a candidate question and corresponding answer. Following step (314), a matrix representing matching question and answer tokens is generated (316). In one embodiment, the size of the generated matrix has a first dimension defined by the number of tokens in the question, and a second dimension defined by the number of tokens in the passage. It is understood that there may be different criteria applied to define matching tokens. For example, a match may be an exact string match, a lemma match, a synonym match, or any matching method of drawing equivalence between two natural language tokens. Accordingly, as the passage is subject to evaluation with the received question, the matrix is generated to represent matching context.

Figure 4A:
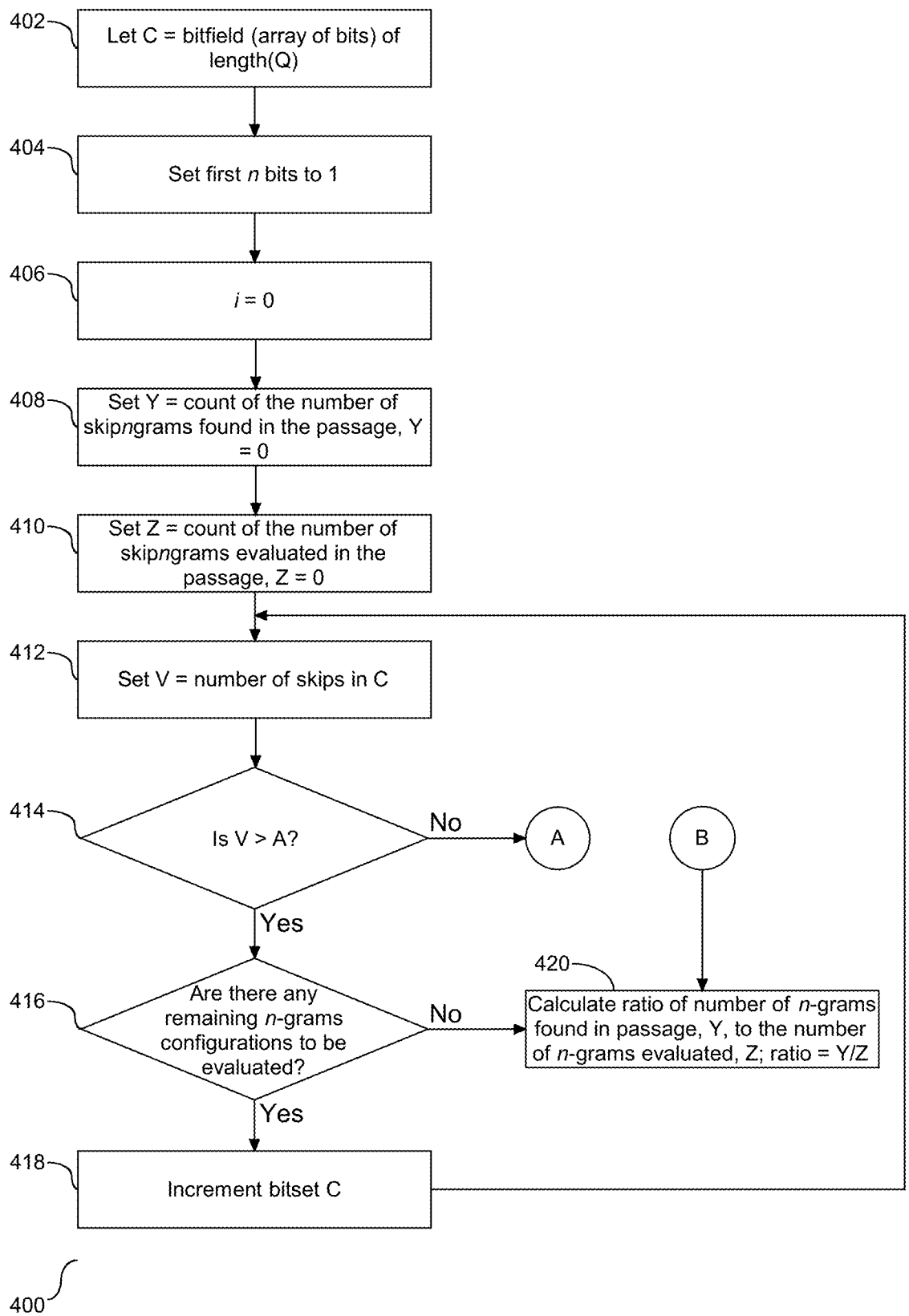
FIGS. 4A-4C depict a flow chart illustrating a process for representing the question and passage as bits and application of bitwise operations.
Figure 4B:
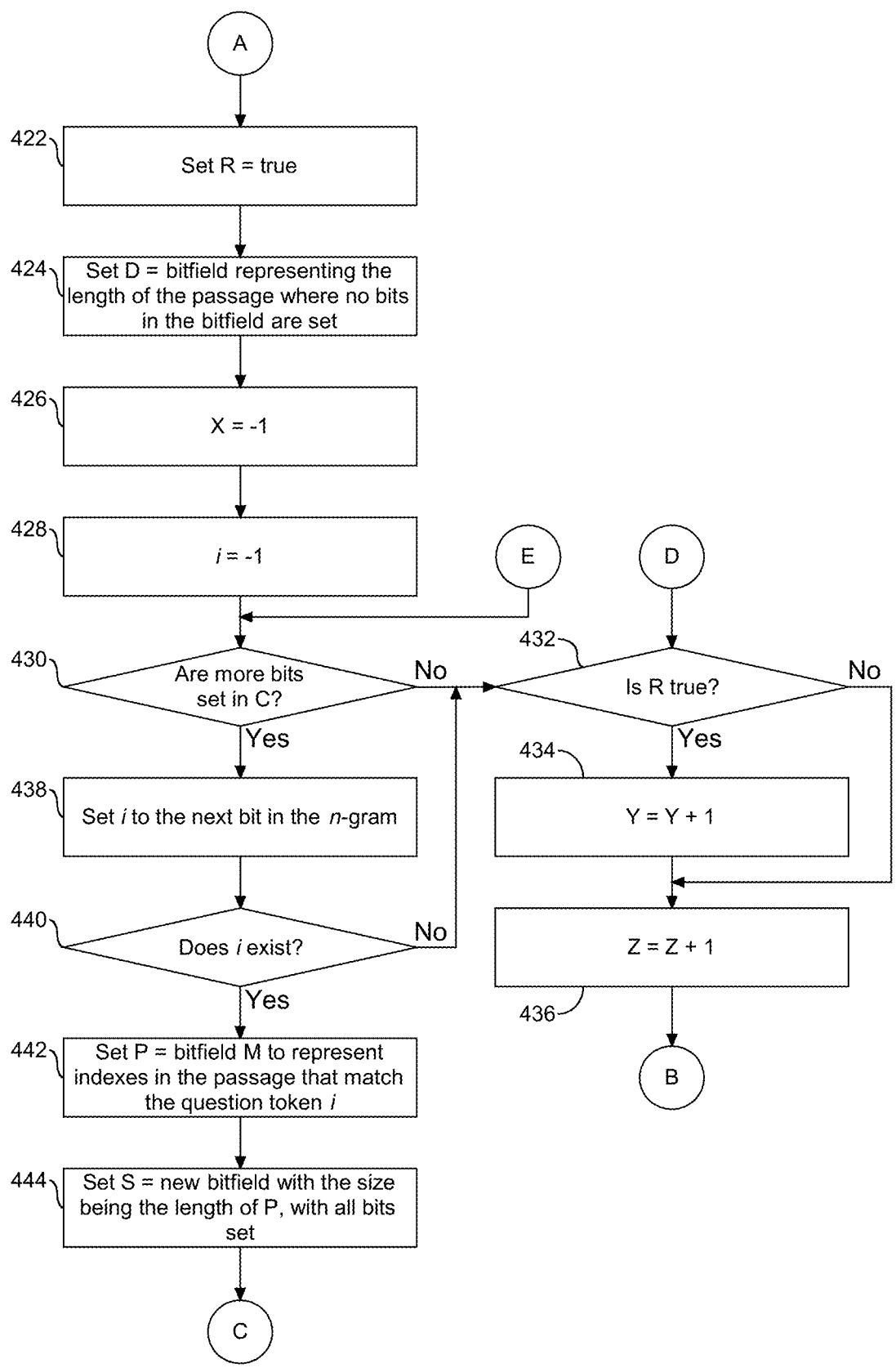
Figure 4C:
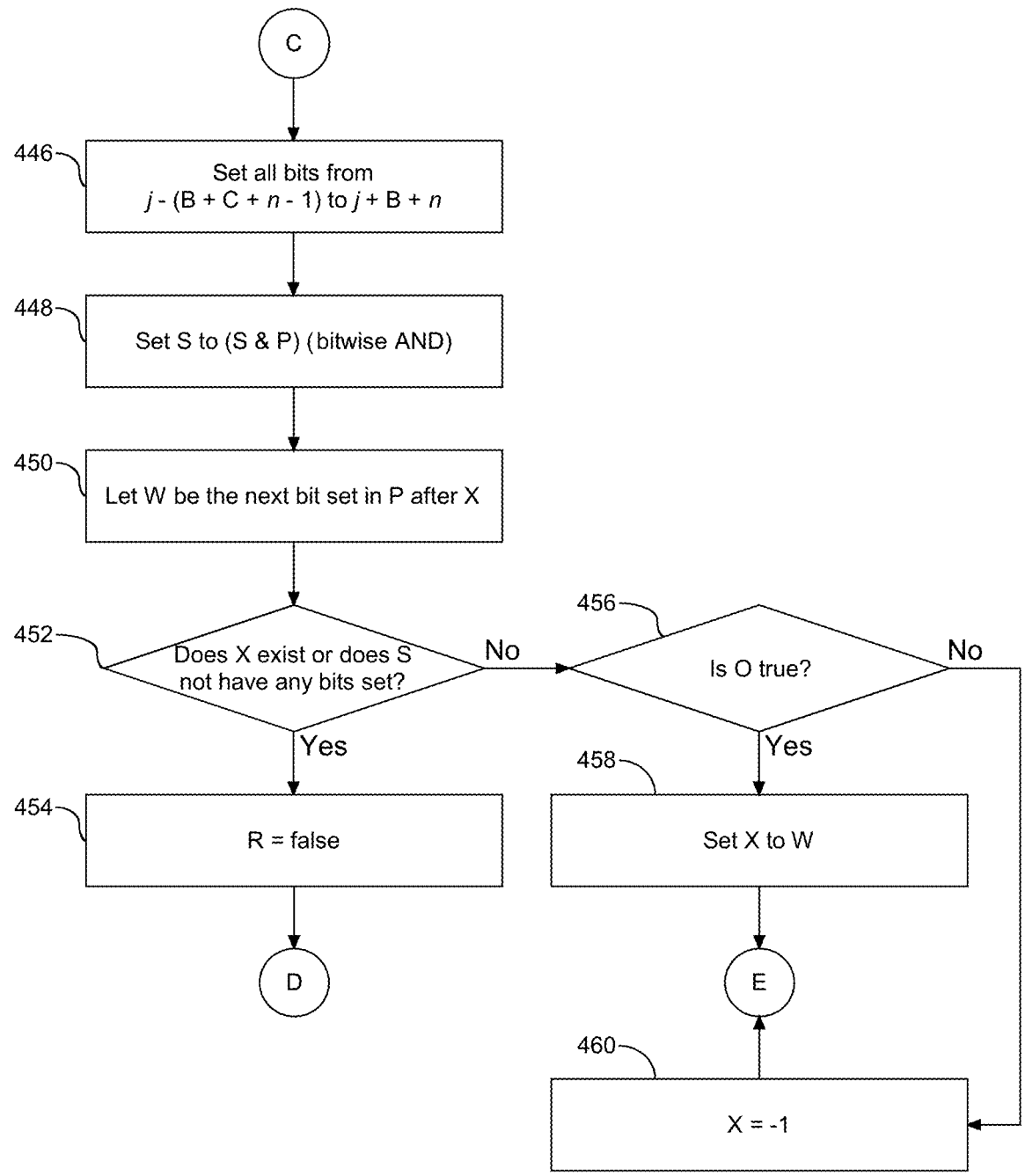

Referring to FIG. 4A-C, a flow chart (400) is provided to illustrate representation of the question and passage as bits and application of bitwise operations. As shown, a variable, C, is defined to represent a bitfield, e.g. an array of bits, with a length defined by the length of the submitted question (402). The first n bits in the bitfield are set, and the remaining bits in the bitfield are not set (404). An n-gram is a contiguous sequence of n items from a given sample of text. For example, when the variable n is set to 2, the contiguous sequence is referred to as a bi-gram and pertains to word pair, when the variable n is set to 3, the contiguous sequence is referred to as a tri-gram requiring an alignment of 3 words, etc. By setting the bit(s) at step (404), the parts of the question that is the basis of the passage evaluation are identified. Following step (404), a word tracking variable, i, is initialized (406). Accordingly, the word tracking variable, i, tracks the words in the n-gram.

The evaluation described herein is directed at quantifying an alignment of the question with the passage, which in one embodiment is a ratio of the quantity of n-grams found in the passage and the quantity of n-grams evaluated in the passage. The variable Y represents a count of the number of n-grams found in the passage, and is subject to initialization (408). Similarly, the variable Z represents a count of the number of n-grams in the passage subject to evaluation, and is similarly subject to initialization (410). The variable V is assigned to the number of tokens from the question represented as a bitfield that can be skipped (412), e.g. omitted from consideration. In one embodiment, each token in the bitfield C that can be omitted from consideration is changed from a 1 to a 0. Following step (412), it is determined if the variable V is greater than the number of skips permitted (414). A positive response to the determination at step (414) is followed by determining if there are any remaining n-gram configurations remaining to be evaluated (416). A positive response to the determination at step (416) is followed by an increment of the bitset C (418) and a return to step (412), and a negative response to the determination at step (416) is followed by calculating a ratio of the number of n- grams found in the passage, Y, to the number of n-grams evaluated, Z (420). The calculated ratio is a numerical indicator assigned to the question and the evaluated passage and characterizes a value of an answer to the question as found in the passage. Accordingly, in addition to identifying an answer within the passage to a presented question, the ratio characterizes the value of the identified answer.

The bitfield C functions as a roadmap of bits that are being searched in a passage with respect to a submitted or presented question. A negative response to the determination at step (414) is an indication that the search of the passage has not concluded. The variable R is set to True (422), and functions as an indicator that the search of the passage is continuing. The variable D represents a bitfield representing the length of the passage where no bits in the bitfield are set (424). A variable X, which represents a location in the passage bitfield is subject to initialization (426), e.g. X=−1. Similarly, a bit counting variable for the question, i, is initialized (428), e.g. i=−1. It is then determined if there are more bits set in C, the question bitfield (430). A negative response to the determination at step (430) is following by determining if the variable R is set to True (432). A positive response to the determination at step (432) is followed by an increment of the variable Y representing a count of n-grams found in the passage (434), and either following step (434) or following a negative response to the determination at step (432), the variable Z, representing the count of the n-grams evaluated, is incremented (436). Thereafter, the process returns to step (420). Accordingly, when it is determined that there are no more tokens to check in the n-gram, the process concludes by updating the ratio calculation.

If at step (430) it is determined that there are more tokens in the n-gram to be evaluated, then the bit counting variable, i, is set to the next bit in the n-gram (438). It is then determined if all of the bits in the n-gram have been evaluated (440), e.g. does i exist. A negative response to the determination at step (440) is followed by a return to step (432) and an update of the ratio calculation. A positive response to the determination at step (440) is followed by the variable P set to the bitfield M to represent indexes in the passage that match the question token i (442), e.g. go to the matrix entry that corresponds to i and represent the entry as a bitfield. The variable S is defined as a new bitfield with the size being the length of P, and all of the bits in S are set (444). Following step (444) a bitwise operation is conducted to set all of the bits in a defined range in the passage that matches a token in the question (446). The following formula is the bitwise operation for step (446):

$$j-(B+C+n-1) \text{ to } j+B+n$$

where j represents each token in the passage that matches a token in the question, and the variable n represents the n-gram value. The bitwise operation defines a range to expand the bits set in the bitfield. Following step (446), the variable S is set to (S & P) (bitwise AND) (448) to discount tokens that are present but not together. More specifically, at step (448) the discount applies to a situation where multiple tokens are being searched and the discount negates situations where only a single token matched, by only setting bits that are set in S and P.

The variable W represents that next bit in P after X (450), e.g. going through the passage. It is then determined if X exists or if S does not have any bits set (452). A positive response to the determination at step (452) is followed by setting the variable R to false (454) and proceeding to step (432). However, a negative response to the determination at step (452) is followed by determining if O is set to true (456). See FIG. 3 defining the order parameter of the tokens. A positive response to the determination at step (456) is followed by setting X to W (458), and returning to step (430). A negative response to the determination at step (456) is followed by setting X to the value of −1 for the next token to return to the beginning of the passage (460) and a return to step (430). Accordingly, as shown herein NLP is conducted in the form of bits and bitwise operations to identify proximity of the passage to the question, and to attach the identified proximity as a confidence value.

Embodiments shown and described herein may be in the form of a computer system for use with an intelligent computer platform for providing dynamic query processing and for development of a corresponding contextual response, and in one embodiment, contextual response data. A processing unit is operatively coupled to memory and is in communication with an artificial intelligence platform. A tool, in communication with the processing unit, is activated by the artificial intelligence platform and employed to provide the query identification and analysis.

Aspect of the query processing shown in FIGS. 1-4C, employs one or more functional tools, as shown and described in FIG. 1. Aspects of the functional tools (152)-(158) and their associated functionality may be embodied in a computer system/server in a single location, or in one embodiment, may be configured in a cloud based system sharing computing resources. With references to FIG. 5, a block diagram (500) is provided illustrating an example of a computer system/server (502), hereinafter referred to as a host (502) in communication with a cloud based support system, to implement the processes described above with respect to FIGS. 1-4C. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

Figure 5:
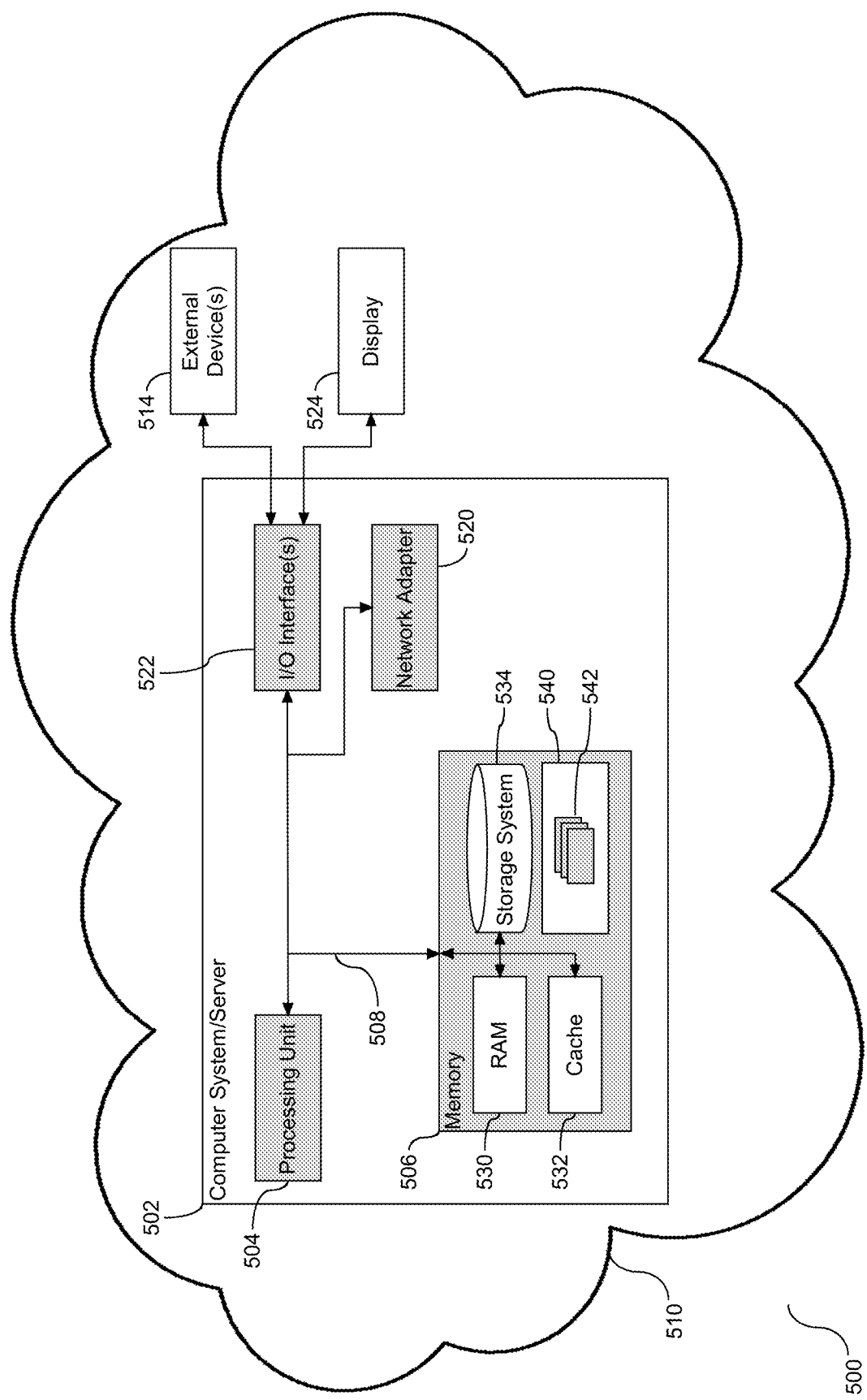
FIG. 5 depicts a block diagram illustrating an example of a computer system/server of a cloud based support system, to implement the system and processes described above with respect to FIGS. 1-4C.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to dynamically communication evaluation interrogatory identification and processing. For example, the set of program modules (542) may include the tools (152)-(158) as described in FIG. 1.

Host (502) may also communicate with one or more external devices (514), such as a keyboard, a pointing device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
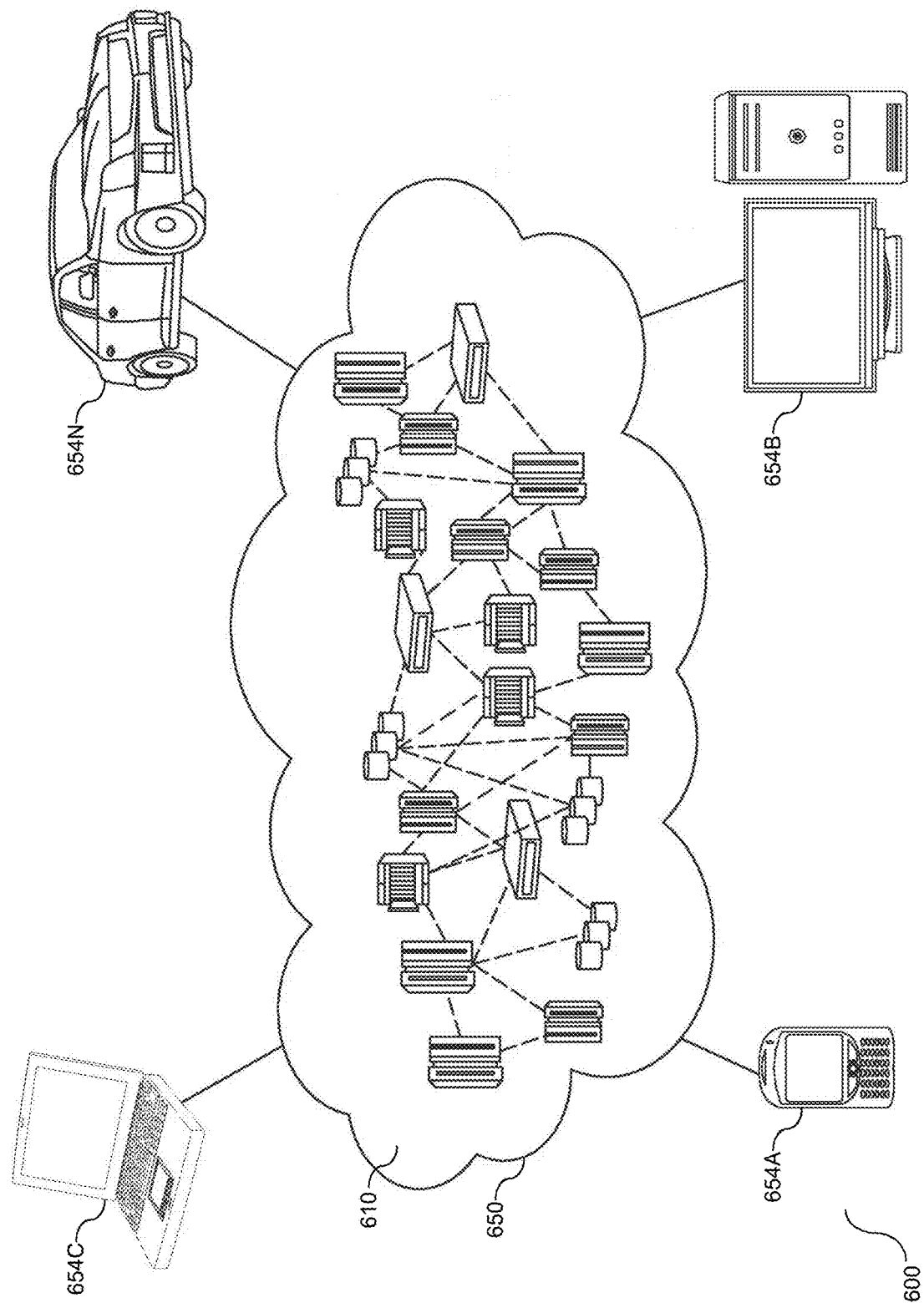
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
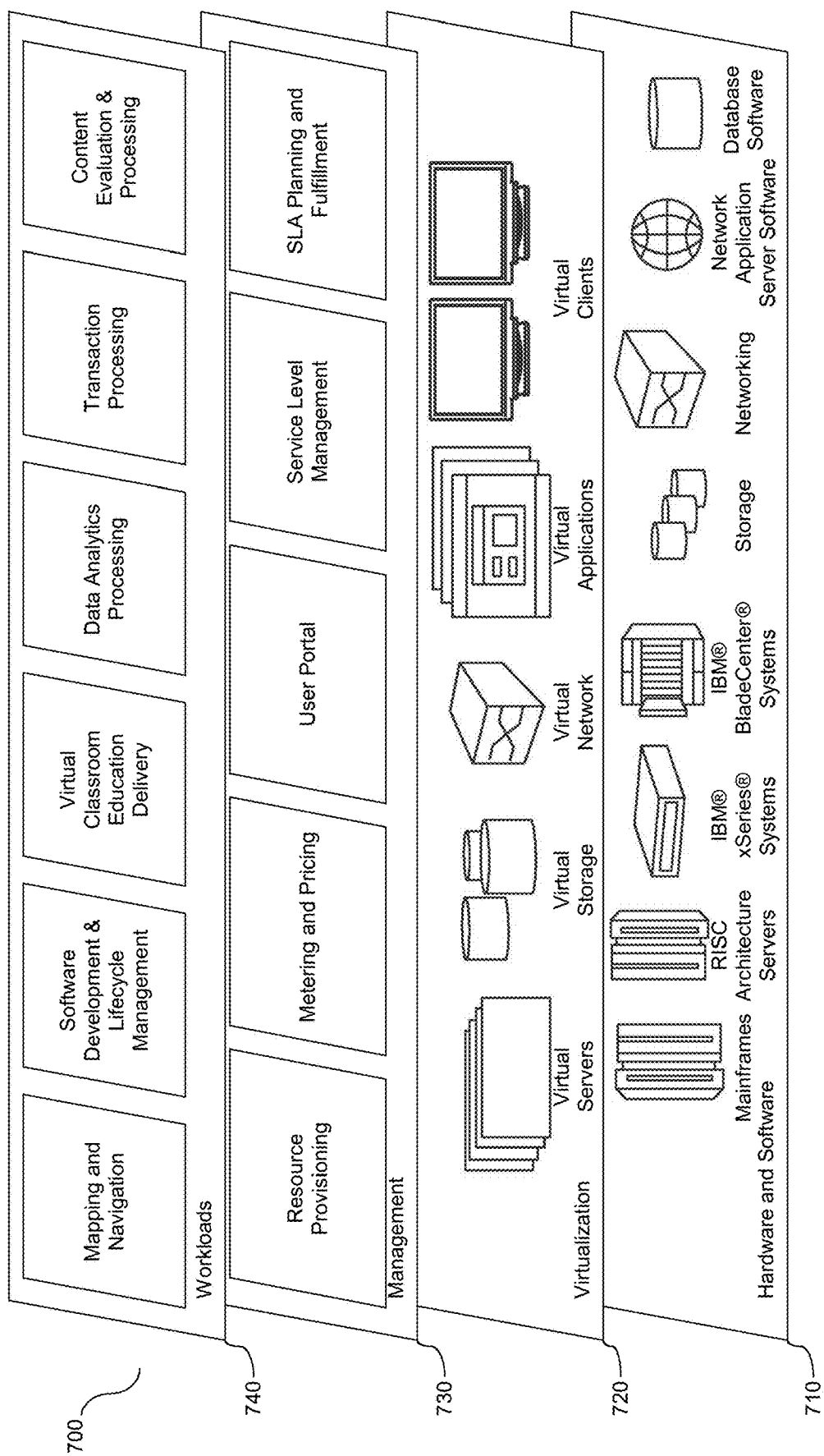
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740).

The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic content evaluation and processing.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer implemented method comprising:
   representing a natural language passage as a plurality of natural language tokens and analyzing the natural language passage in natural language form, including applying one or more natural language input tokens representing a candidate question against one or more passage tokens represented as one or more natural language passage tokens;
   generating a structure including one or more matching entries identifying the one or more input tokens and the one or more passage tokens matching one another;
   representing the one or more input tokens identified by the one or more matching entries in a first compact form;
   representing the one or more passage tokens identified by the one or more matching entries in a second compact form;
   leveraging the structure and iteratively associating the one or more input tokens and the one or more passage tokens matching one another;
   determining a first count of the one or more matching entries that are qualified by a closeness criteria and a second count of one or more entries of the one or more passage tokens subjected to evaluation and that are qualified by the closeness criteria;
   calculating an alignment of the natural language passage to the candidate question represented by the one or more input tokens, the calculating including assessing a ratio of the first count and the second count as a confidence value; and
   returning a candidate answer and the confidence value, wherein the candidate answer is from the natural language passage.

2. The method of claim 1, wherein the representing the one or more input tokens in a first compact form includes representing the one or more input tokens as a first bitfield, and wherein the representing the one or more passage tokens in a second compact form includes representing the one or more passage tokens as a second bitfield.

3. The method of claim 2, further comprising identifying an index in the structure, and representing the identified index as a third bitfield.

4. The method of claim 3, further comprising performing a first bitwise operation using the first and second bitfields, including expanding bits set in the third bitfield, wherein the expansion includes setting all bits within a range that match a first criteria.

5. The method of claim 4, further comprising performing a second bitwise operation using the third bitfield, including discounting when only a single token is found in a multiple token search.

6. The method of claim 3, further comprising applying the closeness criteria as a qualifier in identifying the one or more input tokens and the one or more passage tokens matching one another, and projecting the closeness criteria onto one or more bitfield representations.

7. A computer program product for identifying and evaluating candidate passage responses, the computer program product comprising:
   a computer readable storage medium having program code embodied therewith, the program code executable by a processor to:
   represent a natural language passage as a plurality of natural language tokens and analyze the natural language passage in natural language form, including apply one or more natural language input tokens representing a candidate question against one or more passage tokens represented as one or more natural language passage tokens;
   generate a structure including one or more matching entries identifying the one or more input tokens and the one or more passage tokens matching one another;
   represent the one or more input tokens identified by the one or more matching entries in a first compact form and represent the one or more passage tokens identified by the one or more matching entries in a second compact form;
   leverage the structure and iteratively associate the one or more input tokens and the one or more passage tokens matching one another;
   determine a first count of the one or more matching entries that are qualified by a closeness criteria and a second count of one or more entries of the one or more passage tokens subjected to evaluation and that are qualified by the closeness criteria; and
   calculate an alignment of the natural language passage to the candidate question represented by the one or more input tokens, the calculation including an assessment of a ratio of the first count and the second count as a confidence value; and return a candidate answer and the confidence value, wherein the candidate answer is from the natural language passage.

8. The computer program product of claim 7, wherein the program code executable by the processor to represent the one or more input tokens in a first compact form includes program code executable by the processor to represent the one or more input tokens as a first bitfield, and wherein the program code executable by the processor to represent the one or more passage tokens in a second compact form includes program code executable by the processor to represent the one or more passage tokens as a second bitfield.

9. The computer program product of claim 8, further comprising program code to identify an index in the structure and represent the identified index as a third bitfield.

10. The computer program product of claim 9, further comprising program code to perform a first bitwise operation using the first and second bitfields, including program code to expand bits set in the third bitfield, wherein the expansion includes setting all bits within a range that match a first criteria.

11. The computer program product of claim 10, further comprising program code to perform a second bitwise operation using the third bitfield, including program code to perform a discount when only a single token is found in a multiple token search.

12. The computer program product of claim 9, further comprising program code to apply the closeness criteria as a qualifier in identifying the one or more input tokens and the one or more passage tokens matching one another, and project the closeness criteria onto one or more bitfield representations.

13. A computer system comprising:
    a processing unit operatively coupled to memory; and
    an artificial intelligence (AI) platform in communication with the processing unit, the AI platform to identify and evaluate candidate passage responses, including:
        a natural language (NL) manager configured to represent a natural language passage as a plurality of natural language tokens and analyze the natural language passage in natural language form, including configured to apply one or more natural language input tokens representing a candidate question against one or more passage tokens represented as one or more natural language passage tokens;
        a structure manager operatively coupled to the NL manager, the structure manager configured to generate a structure including one or more matching entries identifying the one or more input tokens and the one or more passage tokens matching one another;
        a token manager configured to:
            represent the one or more input tokens identified by the one or more matching entries in a first compact form and to represent the one or more passage tokens identified by the one or more matching entries in a second compact form;
            leverage the structure and iteratively associate the one or more input tokens and the one or more passage tokens matching one another; and
            determine a first count of the one or more matching entries that are qualified by a closeness criteria and a second count of one or more entries of the one or more passage tokens subjected to evaluation and that are qualified by the closeness criteria; and
        a director configured to:
            calculate an alignment of the natural language passage to the candidate question represented by the one or more input tokens, including to assess a ratio of the first count and the second count as a confidence value; and
            return a candidate answer and the confidence value, wherein the candidate answer is from the natural language passage value.

14. The system of claim 13, wherein the token manager configured to represent the one or more input tokens in a first compact form includes the token manager being configured to represent the one or more input tokens as a first bitfield, and wherein the token manager configured to represent the one or more passage tokens in a second compact form includes the token manager being configured to represent the one or more passage tokens as a second bitfield.

15. The system of claim 14, wherein the structure manager is configured to identify an index in the structure, and to represent the identified index as a third bitfield.

16. The system of claim 15, wherein the director is configured to perform a first bitwise operation using the first and second bitfields, including expanding bits set in the third bitfield, wherein the expansion includes setting all bits within a range that match a first criteria.

17. The system of claim 16, wherein the director is configured to perform a second bitwise operation using the third bitfield, including to perform a discount when only a single token is found in a multiple token search.

18. The system of claim 15, wherein the director is configured to apply the closeness criteria as a qualifier in identifying the one or more input tokens and the one or more passage tokens matching one another, and to project the closeness criteria onto one or more bitfield representations.

19. A computer implemented method comprising:
    analyzing a passage in natural language form, including identifying one or more passage tokens and one or more input tokens matching one another;
    generating a structure representing the analyzed passage, the structure including one or more matching entries identifying the one or more input tokens and the one or more passage tokens matching one another;
    representing the one or more input tokens identified by the one or more matching entries and the one or more passage tokens identified by the one or more matching entries in a first compact form and a second compact form, respectively;
    leveraging the structure and iteratively associating the one or more input tokens and the one or more passage tokens matching one another;
    determining a first count of the one or more matching entries that are qualified by a closeness criteria and a second count of one or more entries of the one or more passage tokens subjected to evaluation and that are qualified by the closeness criteria;
    calculating an alignment of the passage to the one or more input tokens, including assessing a ratio of the first count and the second count as a confidence value; and
    returning data from the passage qualified by the one or more input tokens with the confidence value.

20. The method of claim 19, wherein:
    the representing the one or more input tokens in a first compact form includes representing the one or more input tokens as a first bitfield,
    the representing the one or more passage tokens in a second compact form includes representing the one or more passage tokens as a second bitfield; and the method further comprises identifying an index in the structure, and representing the identified index as a third bitfield.

21. The method of claim 20, wherein the method further comprises performing a first bitwise operation using the first compact form of the one or more input tokens and the second compact form of the one or more passage tokens, including expanding bits set in the third bitfield, wherein the expansion includes setting all bits within a range that match a first criteria.

22. The method of claim 21, further comprising performing a second bitwise operation using the third bitfield, including discounting when only a single token is found in a multiple token search.

23. A computer program product for identifying and evaluating candidate passage responses, the computer program product comprising:
a computer readable storage medium having program code embodied therewith, the program code executable by a processor to:
analyze a passage in natural language form, including identifying one or more passage tokens and one or more input tokens matching one another;
generate a structure representing the analyzed passage, the structure including one or more matching entries identifying the one or more input tokens and the one or more passage tokens matching one another;
represent the one or more input tokens identified by the one or more matching entries and the one or more passage tokens identified by the one or more matching entries in a first compact form and a second compact form, respectively;
leverage the structure and iteratively associate the one or more input tokens and the one or more passage tokens matching one another;
determine a first count of the one or more matching entries that are qualified by a closeness criteria and a second count of one or more entries of the one or more passage tokens subjected to evaluation and that are qualified by the closeness criteria;
calculate an alignment of the passage to the one or more input tokens, including assessing a ratio of the first count and the second count as a confidence value; and
return data from the passage qualified by the one or more input tokens with the confidence value.

24. The computer program product of claim 23, further comprising program code executable by the processor and configured to identify an index in the structure, and representing the identified index as a bitfield.

25. The computer program product of claim 24, wherein the computer program product further comprises program code executable by the processor to perform a bitwise operation, the bitwise operation selected from the group consisting of: a first bitwise operation using the first compact form of the one or more input tokens and the second compact form of the one or more passage tokens and a representation of the structure, and a second bitwise operation using the representation of the structure and discounting when only a single token is found in a multiple token search.

* * * * *